United States Patent [19]

Castel

[11] Patent Number: 5,382,618
[45] Date of Patent: Jan. 17, 1995

[54] USE OF SULFATED LIME DERIVED FROM DRY DESULFURIZATION OF FLUE GAS AS A POLYMER FILLER

[75] Inventor: Claude Castel, le Havre, France

[73] Assignee: Total Raffinage Distribution, S.A., Levallois-Perret Cedex, France

[21] Appl. No.: 150,606

[22] Filed: Nov. 10, 1993

[30] Foreign Application Priority Data

Nov. 10, 1992 [FR] France .................. 92 13532

[51] Int. Cl.⁶ ............................................. C08K 3/30
[52] U.S. Cl. ............................................. 524/423
[58] Field of Search ............ 524/423; 525/331.8, 525/339, 344; 423/166, 243.08

[56] References Cited

U.S. PATENT DOCUMENTS

| | | | |
|---|---|---|---|
| 3,725,336 | 4/1973 | Susuki et al. | 524/423 |
| 3,808,321 | 4/1974 | Fukui et al. | 423/243.08 |
| 3,850,870 | 11/1974 | Kawakami et al. | 524/423 |
| 3,903,243 | 9/1975 | Atsukawa et al. | 423/243.08 |
| 3,951,900 | 4/1976 | Bath | 524/423 |
| 3,953,565 | 4/1976 | Mizutani et al. | 524/423 |
| 4,024,220 | 5/1977 | Ostroff et al. | 423/243.08 |
| 4,038,237 | 7/1977 | Snyder | 524/423 |
| 4,075,374 | 2/1978 | Jorgenson et al. | 524/423 |
| 4,803,231 | 2/1989 | Seinera et al. | 524/423 |
| 4,976,936 | 12/1990 | Rathi et al. | 423/243.08 |
| 5,266,287 | 11/1993 | Johnson | 523/243.08 |
| 5,546,127 | 10/1985 | Hashimoto et al. | 524/423 |

FOREIGN PATENT DOCUMENTS 2588851 4/1987 France .
2119959 1/1972 Germany .

OTHER PUBLICATIONS

E. M. Dannenberg "*Elastomerics*", Dec. 1981, pp. 30-35.

*Primary Examiner*—Veronica P. Hoke
*Attorney, Agent, or Firm*—A. Thomas S. Safford

[57] ABSTRACT

The invention relates to the use of particles of sulfated lime (containing up to 80% $CaSO_4$) as a polymer filler which can be derived from dry desulfurization of flue gas. Such sulfated lime can advantageously be incorporated into an elastomer such as ethylene propylene diene monomer rubber (EPDM) or styrene-butadiene rubber (SBR).

11 Claims, No Drawings

USE OF SULFATED LIME DERIVED FROM DRY DESULFURIZATION OF FLUE GAS AS A POLYMER FILLER

BACKGROUND OF INVENTION

The present invention relates to the use of sulfated lime (mainly calcium sulfate) derived from dry desulfurization of flue gas as a polymer filler.

It is known that flue gas produced by fuels containing sulfur compounds must be purified to remove the sulfur oxides it contains before it can be released into the atmosphere.

Different methods have been proposed in the prior art to achieve this goal. The desulfurization processes currently in use include those comprising contacting the flue gas with particles of an absorbing material containing at least one basic compound of an alkaline earth metal (see, for example, French Patent [FR] A-2 636 720). The most frequently used absorbents are, in particular, limestones ($CaCO_3$), slaked lime ($Ca(OH)_2$) and the dolomites ($CaMg(CO_3)_2$). The absorbents usually have a particle size of 1 to 100 microns.

The flue gas desulfurization is carried out at an elevated temperature above 700° C. and, at this temperature, the above-said compounds are at least partly converted into quicklime with elimination of water and carbon dioxide.

Upon contact with flue gas, the quicklime particles react with the sulfur oxides present therein with formation of calcium sulfate and, thereafter, they contain a large amount of this compound.

In the present description and the attached claims, said particles containing a large amount of calcium sulfate, typically derived from the desulfurization of flue gas, shall be referred to by the term "sulfated lime".

Sulfated lime usually contains in weight percent 40 to 80% of calcium sulfate, $CaSO_4$, and 10 to 50% of quicklime, $CaO$, the remainder consisting essentially of 0 to 10% of calcium carbonate, $CaCO_3$, and 0 to 15% of slaked lime, $Ca(OH)_2$. These, of course, are average compositions, it being possible to use within the scope of the invention sulfated lime of a different composition.

Sulfated limes usually have a bulk density of 0.35 to 0.80 g/cm$^3$. The particle size is usually between $1 \times 10^{-6}$ and $100 \times 10^{-6}$ m, with an average of $2 \times 10^{-6}$ to $40 \times 10^{-6}$ m.

The large-scale use of such absorbents for the desulfurization of flue gas can produce annually about ten thousand metric tons of sulfated lime per desulfurization unit. Said sulfated lime is thus an available material.

Applicant and others have for a long time been studying the possible use of these desulfurization by-products and unexpectedly has now found that the sulfated lime derived from the desulfurization of flue gas can advantageously replace the fillers incorporated into polymers.

It is known to incorporate different powdered fillers into polymers such as polyvinyl chloride and, more particularly, into elastomers such as natural or synthetic rubbers. Usually one distinguishes between inert fillers, namely those that are used simply to reduce the amount of polymer in a formulation by incorporating into said polymer a low-cost material, for example chalk, and reinforcing or semi-reinforcing fillers capable of modifying the properties of the polymer. The latter kinds of fillers include carbon black, precipitated silica and kaolin which when incorporated, for example, into elastomers enables said elastomers to meet certain industrial specifications.

SUMMARY OF THE INVENTION

Work carried out by applicant has led to the conclusion that sulfated lime not only can be used for such applications, but that, when replacing inert fillers in certain polymers, said sulfated lime has an appreciable effect on certain properties of said polymers.

A first advantage of the invention is therefore to upgrade the usefulness of sulfated lime from a waste by-product derived from the desulfurization of flue gas by using it as a filler in polymers.

Another advantage of the invention is to replace the inert polymer fillers of the prior art with sulfated lime, the cost of which is usually lower and the use of which exerts beneficial effects on the properties of certain polymers.

Hence, the invention has for a preferred embodiment the utilization of particles of sulfated lime derived from the dry desulfurization of flue gas as a polymer filler. It will be understood that sulfated lime can be used in combination with other fillers, such as carbon black, silica or kaolin, without thereby exceeding the scope of the invention.

In this definition of the invention, by "polymers" we mean all polymers in which it is known to use inert fillers.

Polymers containing sulfated lime as an inert filler constitute another embodiment of the present invention.

In fact, applicant's studies have shown that sulfated lime particles disperse uniformly and in a large amount in polymers in which inert fillers are usually employed. Moreover, sulfated lime modifies the physicochemical properties of said polymers to a lesser degree than do conventional fillers.

Sulfated lime can be added to the polymer in an amount of up to 1000 parts by weight of sulfated lime per 100 parts of polymer, depending on the nature of the polymer.

Applicant has discovered that when sulfated lime is incorporated into an elastomer it increases the vulcanization rate of said elastomer in the presence of the usual vulcanization additives and under the usual vulcanization conditions. Moreover, sulfated lime improves the elastic properties of the elastomer without altering the other physical properties.

Hence, still another embodiment of the present invention is the utilization of sulfated lime particles as a filler in elastomers.

The beneficial effects of said sulfated lime become particularly evident when said sulfated lime is incorporated into ethylene propylene diene monomer rubber (EPDM) or styrene-butadiene rubber (SBR).

In such an application, sulfated lime will preferably be used in an amount of 100 to 1000 parts by weight per 100 parts of elastomer.

Although it is this incorporation of sulfated lime into elastomers that will be described in greater detail hereinbelow because it is advantageous, the invention, of course, applies to all polymers wherein inert or non-inert fillers are commonly used.

It will be recalled that a rubber composition usually contains a base rubber (for example EPDM or SBR), one or more fillers, a plasticizer, a vulcanization agent (for example sulfur), one or more vulcanization activators (zinc oxide and/or stearic acid) and one or more vulcanization accelerators. The filler preferably has a particle size below $100 \times 10^{-6}$ m, a low water content and preferably a basic pH.

The possibility of making such blends depends on the quantity of filler and plasticizer added. In fact, if the relative quantity of plasticizer is too high, the product obtained will have the consistency of a putty, and if the quantity of filler is too high, a powdered product will result.

DETAILED DESCRIPTION OF PREFERRED EMBODIMENTS OF THE INVENTION

The following was used in all tests described hereinbelow.

Rubbers: EPDM, commercially supplied by "SOCABU," derived from about 9% of 5-ethylidene-2-norbornene, about 52% of ethylene and about 39% of propylene, with a Mooney viscosity (ML 1+8) of 82±5 at 125° C. and which has good cohesion in the uncured state, good low-temperature resistance and good extrudability.

Plasticizers: a paraffin oil, supplied commercially by "TOTAL" under the name "PLAXENE 6110."

Vulcanization agent: sulfur.

Vulcanization activator: zinc oxide and stearic acid, used in combination.

Vulcanization accelerator: mercapto benzo thiazole and dithio carbamate of zinc, supplied commercially by "VULNAX" under the name "VULCAFOR 2."

Optional lubricant: zinc stearate. The sulfated lime, CS1, used in these examples had the following characteristics:

| Composition (wt %) | |
|---|---|
| $H_2O$ | 0.3 |
| $CaCO_3$ | 3.3 |
| $CaSO_4$ | 48.6 |
| $Ca(OH)_2$ | 6.6 |
| CaO | 41.2 |
| Bulk density | 0.41 g/cm³ |
| Particle size | 2–30 × $10^{-6}$ m |
| Average diameter | 9 × $10^{-6}$ m |

In the tests, the hardness, expressed in INTERNATIONAL SHORE A degrees, was determined in accordance with AFNOR (Association Francaise de Normalisation [French Association for Standardization]) standard method 46003.

The rheometric curves were recorded in accordance with AFNOR standard method 43015 using a "MONSANTO" rheometer.

Tensile strength and elongation were determined in accordance with AFNOR standard method 46002.

By means of appropriate formulas, the results obtained for EPDM can be transposed to SBR.

EXAMPLE 1

The purpose of this example is to compare the properties of black compositions containing carbon black as the reinforcing filler (FEF black [fast-extruding furnace black]-ASTM standard N 550). Said compositions, respectively, contained the following:

Composition A: sulfated lime;
Composition B: a high-quality commercial chalk, sold by "OMYA" under the name "OMYA BSH Chalk (Special Hydrophobic White)";
Composition C: a chalk, used as a reference standard, sold by "OMYA" under the name "OMYA Violet Chalk."

The amounts of the constituents and the properties of said compositions are collected in the following Table I.

TABLE I

| | A | B | C |
|---|---|---|---|
| COMPOSITION (wt %) | | | |
| EPDM | 100 | 100 | 100 |
| FEF Black | 70 | 70 | 70 |
| Sulfated lime CS1 | 80 | — | — |
| Omya BSH Chalk (Hydrophobic) | — | 80 | — |
| Omya Violet Chalk | — | — | 80 |
| Plaxene 6110 | 50 | 50 | 50 |
| ZnO | 5 | 5 | 5 |
| Stearic acid | 1 | 1 | 1 |
| Sulfur | 2 | 2 | 2 |
| Vulcafor 2 | 5 | 5 | 5 |
| PROPERTIES | | | |
| Vulcanization time rheometer T90, (180° C.) | 3 mn 30 s | 4 mn 04 s | 3 mn 04 s |
| Vulcanization curve | | | |
| Minimum torque, Nm | 10 | 9.5 | 12 |
| Maximum torque, Nm | 83 | 76 | 68 |
| Tensile strength, MPa | 8.8 | 9.7 | 7.1 |
| Elongation at break, % | 400 | 320 | 270 |
| 100% modulus, MPa | 2.4 | 2.6 | 2.6 |
| 300% modulus, MPa | 6.6 | 8.4 | — |
| Hardness, internat'l | 64 | 63 | 66 |

The results presented in Table I indicate that at virtually equal hardness (64°–66° Shore), the sulfated lime replacing commercial chalk in Composition A increased the elongation at break of the elastomer composition while the tensile strength remained close to that of the composition containing the high-quality chalk (Composition B).

EXAMPLE 2

The purpose of this example is to compare the properties of a light-colored composition containing a light-colored reinforcing filler consisting of high-quality kaolin, sold under the name "WHITETEX No. 2" (Composition D) and optionally containing an additional filler of sulfated lime; according to the present invention (Composition E), "OMYA BSH Chalk" (Composition F) and "OMYA Violet Chalk" (Composition G).

The amounts of the constituents and the properties of said compositions are collected in the following Table II.

TABLE II

| | D | E | F | G |
|---|---|---|---|---|
| COMPOSITION (wt %) | | | | |
| EPDM | 100 | 100 | 100 | 100 |
| Whitetex | 175 | 87.5 | 87.5 | 87.5 |
| Sulfated lime | — | 87.5 | — | — |
| Omya BSH Chalk | — | — | 87.5 | — |
| Omya Violet Chalk | — | — | — | 87.5 |
| Plaxene 6110 | 60 | 60 | 60 | 60 |
| Zno | 5 | 5 | 5 | 5 |
| Stearic acid | 1 | 1 | 1 | 1 |
| Sulfur | 2 | 2 | 2 | 2 |
| Vulcafor 2 | 5 | 5 | 5 | 5 |
| PROPERTIES | | | | |
| Vulcanization time 40 s rheometer T90, (180° C.) | 6 mn | 2 mn 54 s | 4 mn 54 s | 5 mn |
| Vulcanization curve | | | | |
| Minimum torque, Nm | 8 | 9 | 6 | 7 |

TABLE II-continued

|  | D | E | F | G |
|---|---|---|---|---|
| Maximum torque, Nm | 67 | 55 | 52 | 63 |
| Tensile strength, MPa | 6.3 | 4.7 | 3.6 | 2.3 |
| Elongation at break, % | 480 | 640 | 450 | 380 |
| 100% modulus, MPa | 2.2 | 1.2 | 1.2 | 1.2 |
| 300% modulus, MPa | 4 | 2 | 2.4 | 1.9 |
| Hardness, internat'l | 58 | 52 | 53 | 55 |

Table II shows that sulfated lime-containing Composition E, with a slightly lower hardness than Composition D which contains only the reinforcing "WHITE-TEX" filler, contains one half the amount of said reinforcing filler; furthermore, Composition E has a higher elongation than all the other compositions and a higher tensile strength than Compositions F and G which contain a chalk filler.

Note also the excellent (short) vulcanization times of Composition E containing sulfated lime.

EXAMPLE 3

The purpose of this example is to study the effect of the addition of sulfated lime on the vulcanization of the elastomers.

The first test was carried out with two compositions, H and J, containing respectively sulfated lime CS1 (characterized hereinabove) and sulfated chalk CS2 (derived from the sulfation of chalk, $CaCO_3$, being within the broad definition of "sulfated lime," and having the following characteristics):

| Bulk density | 0.71 g/cm$^3$ |
|---|---|
| Composition (wt %): | |
| $H_2O$ | 0.5 |
| $Ca(OH)_2$ | 12.3 |
| $CaSO_4$ | 41.5 |
| $CaCO_3$ | 4.8 |
| CaO | 40.9 |

Tests were carried out by varying the amount of sulfur and vulcanization activator for these compositions.

The characteristics of said compositions and the test results obtained are presented in the following Table III.

TABLE III

|  | H |  | J |  |
|---|---|---|---|---|
| COMPOSITION (wt %) | | | | |
| EPDM | 100 | | 100 | |
| FEF Black | 70 | | 70 | |
| Sulfated lime CS1 | 80 | | — | |
| Sulfated chalk CS2 | — | | 80 | |
| Plaxene 6110 | 50 | | 50 | |
| ZnO | 5 | | 5 | |
| Stearic acid | 1 | | 1 | |
| Sulfur | 2 | 1 | 2 | 1 |
| Vulcafor 2 | 5 | 2.5 | 5 | 2.5 |
| PROPERTIES | | | | |
| Tensile strength, MPa | 8.8 | 7.5 | 6.7 | 8 |
| Elongation, % | 400 | 440 | 280 | 415 |
| 100% modulus, MPa | 2.4 | 1.7 | 2.4 | 2.1 |
| 300% modulus, MPa | 6.6 | 5 | — | 6 |
| Hardness, internat'l | 64 | 61 | 63 | 61 |
| Vulcanization time rheometer T90, 180° C. | 3 mn 30 s | 3 mn 44 s | 3 mn 42 s | 3 mn 54 s |

These tests indicate that it is possible to reduce the quantity of sulfur and vulcanization accelerator ("VUL-CAFOR 2") to one half without appreciably extending the vulcanization time.

Another series of tests was carried out with three compositions, K, L and M, which contained the same amount of sulfated lime CS1, but variable amounts of sulfur and vulcanization accelerator.

The amounts of the constituents and the properties of said compositions are collected in the following Table IV.

TABLE IV

|  | K | L | M |
|---|---|---|---|
| COMPOSITION wt % | | | |
| EPDM | 100 | 100 | 100 |
| Sulfated lime CS1 | 600 | 600 | 600 |
| Plaxene 6110 | 200 | 200 | 200 |
| ZnO | 5 | 5 | 5 |
| Stearic acid | 1 | 1 | 1 |
| Zinc stearate | 10 | 10 | 10 |
| Sulfur | 2 | 1 | 1 |
| Vulcafor 2 | 5 | 2.5 | 5 |
| PROPERTIES | | | |
| Tensile strength, MPa | 1.4 | 1.5 | 1.5 |
| Elongation, % | 700 | 750 | 800 |
| 100% modulus, MPa | 0.5 | 0.6 | 0.7 |
| Hardness, internat'l | 45 | 42 | 36 |
| Vulcanization time rheometer T90, 180° C. | 1 mn 48 s | 4 mn 09 s | 3 mn 11 s |
| Rheometric curves | | | |
| Minimum torque, Nm | 1.58 | 1.47 | 1.32 |
| Maximum torque, Nm | 20.76 | 20.54 | 23.13 |

The results shown in this table indicate that if either the quantity of sulfur (Composition M) or the quantity of sulfur and vulcanization accelerator (Composition L) is halved, the torques indicated by the rheometric curves remain the same and only the vulcanization time is prolonged.

Note the very large amount of sulfated lime used in Compositions K, L and M (600 parts by weight per 100 parts of rubber). It was not possible to carry out a comparative test with commercial limestone fillers, because it was not possible to devise compositions with such high amounts of filler while using the same amount of plasticizer.

The tests described in the preceding examples thus show clearly that inert fillers in polymers can be replaced with sulfated lime and that in the case of elastomer compositions such a replacement has a beneficial effect on mechanical properties and the vulcanization of said compositions.

Sulfated lime therefore constitutes a highly advantageous replacement for conventional polymer fillers.

It is understood that the invention is not restricted to the detailed description of the invention, which may be modified without departure of the accompanying claims.

I claim:

1. A vulcanized elastomeric composition, comprising an elastomer and particles of sulfated lime as a dispersed filler, wherein the sulfated lime is derived from the dry desulfurization of flue gas and comprises, in percent by weight, from 40 to 80% of calcium sulfate, from 10 to 50% of quicklime, from 0 to 10% of calcium carbonate and from 0 to 15% of slaked lime.

2. The elastomeric composition of claim 1, wherein the sulfated lime has a particle size from $1 \times 10^{-6}$ to $100 \times 10^{-6}$ m.

3. The elastomeric composition of claim 2, wherein the sulfated lime has an average particle size from $2 \times 10^{-6}$ to $40 \times 10^{-6}$ m.

4. The elastomeric composition of claim 3, wherein the sulfated lime has a bulk density from 0.35 to 0.80 g/cm$^3$.

5. The elastomeric composition of claim 4, wherein the sulfated lime is incorporated into the elastomeric composition in an amount of up to 1000 parts by weight per 100 parts of elastomer.

6. The elastomeric composition of claim 1, wherein the elastomer is an ethylene propylene diene monomer rubber.

7. The elastomeric composition of claim 5, wherein the elastomer is an ethylene propylene diene monomer rubber.

8. The elastomeric composition of claim 1, wherein the elastomer is a styrene-butadiene rubber.

9. The elastomeric composition of claim 5, wherein the elastomer is a styrene-butadiene rubber.

10. A method of using sulfated lime as a filler for a vulcanized elastomer, comprising the steps of:
   a) providing a elastomer; and
   b) incorporating, as a filler, particles of sulfated lime derived from the dry desulfurization of flue gas in an amount of up to 1000 parts by weight 100 parts of elastomer, wherein the sulfated lime comprises, in percent by weight, from 40 to 80% of calcium sulfate, from 10 to 50% of quicklime, from 0 to 10% of calcium carbonate and from 0 to 15% of slaked lime, and
   c) vulcanizing the resulting mixture of elastomer and filler.

11. The method of claim 10, wherein the sulfated lime has a particle size from $1 \times 10^{-6}$ to $100 \times 10^{-6}$ m and an average particle size from $2 \times 10^{-6}$ to $40 \times 10^{-6}$ m with a bulk density from 0.35 to 0.80 g/cm$^3$.

* * * * *